United States Patent [19]
Eyhorn et al.

[11] Patent Number: 6,110,310
[45] Date of Patent: Aug. 29, 2000

[54] PANEL-SHAPED, EVACUATED MOLDED ELEMENT, METHOD OF THERMAL INSULATION AND USE OF THE MOLDED ELEMENT

[75] Inventors: Thomas Eyhorn, Altusried; Johann Klaus, Sulzberg; Günter Kratel, Durach, all of Germany; Baudewijn van Gucht, Bornem, Belgium

[73] Assignee: Wacker-Chemie GmbH, Munich, Germany

[21] Appl. No.: 09/248,028

[22] Filed: Feb. 10, 1999

[30] Foreign Application Priority Data

Feb. 19, 1998 [DE] Germany ............ 198 06 993
Aug. 13, 1998 [DE] Germany ............ 198 36 830

[51] Int. Cl.⁷ ............ B32B 31/18; B32B 31/14; B32B 31/26
[52] U.S. Cl. ............ 156/188; 156/185; 428/69; 428/167
[58] Field of Search ............ 428/69, 76, 167, 428/36.9; 52/309.15; 156/187, 188, 281, 185

[56] References Cited

U.S. PATENT DOCUMENTS

| | | |
|---|---|---|
| 4,505,977 | 3/1985 | Hasenauer et al. |
| 5,445,857 | 8/1995 | Nowobilski ............ 428/69 |
| 5,843,353 | 12/1998 | Vos et al. ............ 428/69 |
| 5,900,299 | 5/1999 | Wynne ............ 428/69 |

FOREIGN PATENT DOCUMENTS

| | | |
|---|---|---|
| 1 210 275 | 10/1970 | Canada. |
| 0 069 543 | 1/1983 | European Pat. Off.. |
| 0 090 191 | 10/1983 | European Pat. Off.. |
| 1 954 992 | 5/1971 | Germany. |
| 36 30 399 | 3/1988 | Germany. |
| 44 32 896 | 3/1996 | Germany. |
| 44 32 896 A1 | 3/1996 | Germany. |
| 196 52 731 | 10/1997 | Germany. |

OTHER PUBLICATIONS

English Abstract corresponding to DE 36 30 399.
English Abstract corresponding to DE 196 52 731.
English Abstract corresponding to DE 44 32 896.
English Abstract corresponding to DE 44 32 896 A1.

Primary Examiner—Alexander S. Thomas
Attorney, Agent, or Firm—Brooks & Kushman P.C.

[57] ABSTRACT

The invention relates to a panel-shaped, evacuated and thermally insulating molded element which contains pressed and optionally hardened, microporous insulating material, wherein the insulating material is in one or more sheathed and evacuated layers, and the molded element has a surface with a lamellar structure, the lamellae being produced by elongate incisions into the surface and having a depth of 40 to 95% of the thickness of the molded element. The invention also relates to a method of insulation for curved surfaces with thermally insulating material, wherein the molded element is made to fit with the surface with a lamellar structure snugly against the curved surface, is fixed in position, and the vacuum is destroyed in at least one layer.

11 Claims, 3 Drawing Sheets

PANEL-SHAPED, EVACUATED MOLDED ELEMENT, METHOD OF THERMAL INSULATION AND USE OF THE MOLDED ELEMENT

TECHNICAL FIELD

The invention relates to panel-shaped, evacuated, and thermally insulating molded elements which contain pressed and optionally hardened, microporous insulating material. The invention also relates to a method of thermal insulation for curved surfaces, in particular pipes, and to use of the molded elements.

BACKGROUND ART

DE-4432896 A1 discloses an evacuated, thermally insulating molded element which is based on pressed and optionally hardened, microporous insulating material, enclosed in a sheath with a gastight effect.

For the thermal insulation of elements with curved surfaces, in particular pipes and cylinders, such a molded element is suitable only to a certain extent. For instance, expenditure of considerable force is necessary to make the molded element fit snugly against a curved surface. The coverage of the surface usually remains incomplete owing to the stiffness of the material and the dimensional tolerances of the surface. This and the unavoidable creasing of the molded element when it is made to fit snugly against the curved surface are the cause of incomplete thermal insulation.

The use of a thick molded element for thermal insulation or the thermal insulation of highly curved surfaces is not possible at all, because the molded element cannot bend, or cannot bend adequately.

SUMMARY OF INVENTION

The present invention discloses effective thermal insulation for curved surfaces which may be of appreciable thickness, and molded elements of specified generic type which are suitable for use therein.

The invention relates to a panel-shaped, evacuated and thermally insulating molded element which contains pressed and optionally hardened, microporous insulating material, wherein the insulating material is in one or more sheathed and evacuated layers, and the molded element has a surface with a lamellar structure, the lamellae being produced by elongate incisions into the surface and having a depth of 40 to 95% of the thickness of the molded element.

The invention also relates to a method of insulation for curved surfaces with thermally insulating material, wherein the claimed molded element is made to fit with the surface with a lamellar structure snugly against the curved surface and is fixed and the vacuum is destroyed in at least one layer.

The lamellar structure allows even relatively thick molded elements to be placed against curved surfaces without exerting particular force, and even surfaces with a narrow radius of curvature can be thermally insulated in this way. Permeable locations remaining in the thermal insulation are eliminated, or at least reduced, by destroying the vacuum. This increases the volume of the molded element, and gaps or cracks through which heat can pass are made smaller or are closed.

If particularly effective thermal insulation is required, a multilayer structure of the molded element is preferred, comprising two to five or more layers. The layers may be arranged in such a way that the joints are staggered, resulting in a further reduction in heat loss.

The thermal conductivity of an insulating substance can be drastically lowered by reducing the air pressure in the system. The efficiency of a microporous insulating substance can be improved by a factor of up to 10 if the partial pressure within the insulating substance is lowered below 5 to 10 mbar, the level of the subatmospheric pressure determining the effectiveness of the thermal insulation.

Particularly efficient thermal insulation is achieved if the molded element used for thermal insulation is of a multilayer design and the vacuum is not destroyed in all the layers, with at least one layer remaining in the evacuated state. By the use of suitable sheathings, for example multilayer films, the stability of the remaining vacuum can be preserved for years.

With such a molded element with evacuated and non-evacuated layers, pipelines for example can be insulated more economically and technically effectively than with known systems.

The incisions in the surface and the subatmospheric pressure in the gastight sheathing have the effect that, depending on its stiffness, the film can be drawn somewhat into the incisions. As a result, sheathing the curved surface without creases can be ensured. Both these features increase the effectiveness of the thermal insulation.

BRIEF DESCRIPTION OF THE DRAWINGS

The invention is explained in more detail below with the aid of figures.

DETAILED DESCRIPTION OF THE INVENTION

Figure 1:
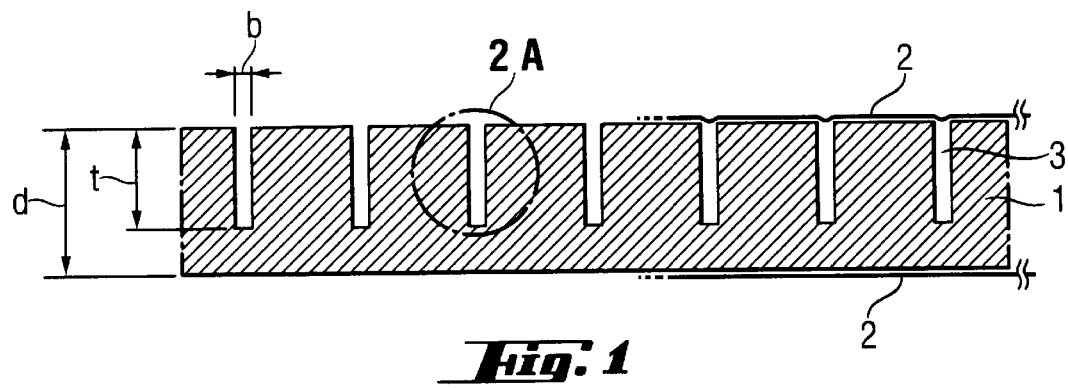
FIG. 1 shows a preferred embodiment of a molded element in cross section.
Figure 2:
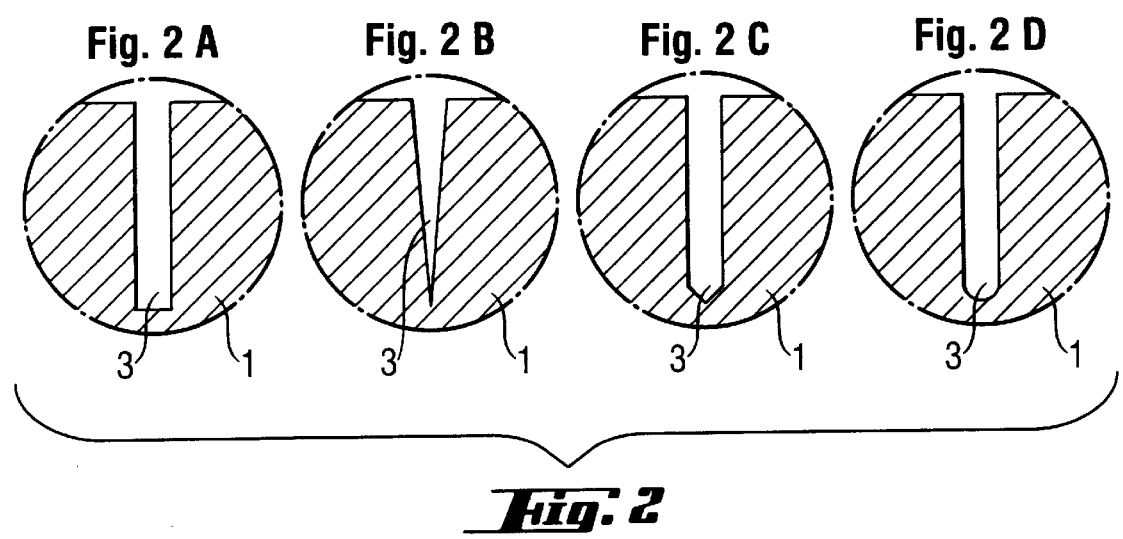
FIG. 2 shows preferred cross-sectional shapes of lamellae of molded elements in enlarged representations.

The molded element according to FIG. 1 is panel-shaped and consists entirely or partially of microporous insulating material 1 and a gastight sheathing 2 (only partially and schematically represented). It has a surface which is structured by elongate incisions 3 (lamellae). The lamellae have a depth t of 40 to 95%, particularly preferably 60 to 85%, of the thickness d of the molded element. A depth, t, of at least 5 mm is typical. The thickness, d, of the molded element is governed by the desired thermal insulating effect. The necessity to use lamellae in the molded elements arises in the case of wall thicknesses which are >5% of the pipe diameter in the case of small pipes (diameter about 50 mm) and >2% of the pipe diameter in the case of large pipes (diameter at least 300 mm). The stiffness of the molded element, which is primarily dependent on its density, plays a part here. The lamellae are preferably arranged at a spacing of 4 to 40 mm, particularly preferably 10 to 20 mm, next to one another and preferably parallel to one another and have a base width, b, of 0.5 to 5 mm, preferably 1 to 3 mm. Their cross section preferably has a square, rectangular, acute-angled or rounded shape, particularly preferably one of the shapes A–D shown in FIG. 2. The spacing between the lamellae depends on the one hand on the chosen base width and on the other hand on the inside diameter to be achieved. If the base widths of the individual lamellae are added, the difference between the outer circumference and inner circumference of the molded element lying against the curved surface should be approximately obtained.

Figure 3:
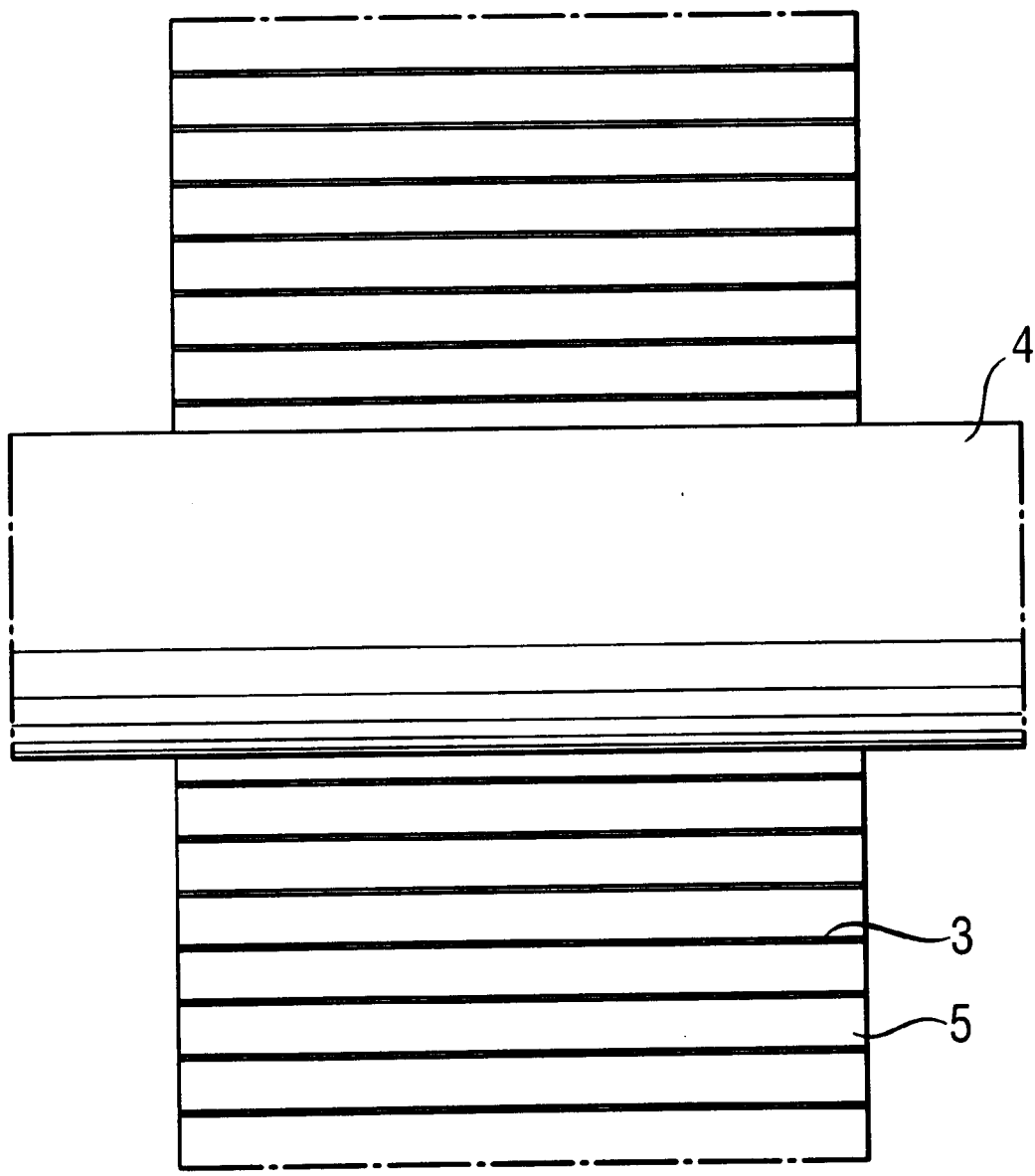
FIG. 3 illustrates the way in which a pipe may be sheathed with the molded element.

A particularly advantageous method of insulating curved surfaces with thermally insulating material is accomplished by the molded element being made to fit with its structured surface snugly against the curved surface and fixed and by the vacuum subsequently being destroyed. This is indicated by the example of the insulation of a pipe 4 in FIG. 3. The sheathed molded element 5 is placed around the pipe 4, the surface provided with lamellae coming to lie on the circumferential surface of the pipe. The lamellar structure allows the molded element to bend according to the contour of the pipe, even if the thickness d is relatively large and/or the radius of curvature of the pipe is comparatively small. The evacuated molded element is preferably used for the insulation of pipes, for example pipelines for crude oil and district heating lines, engines, turbines and chimneys.

Figure 4:
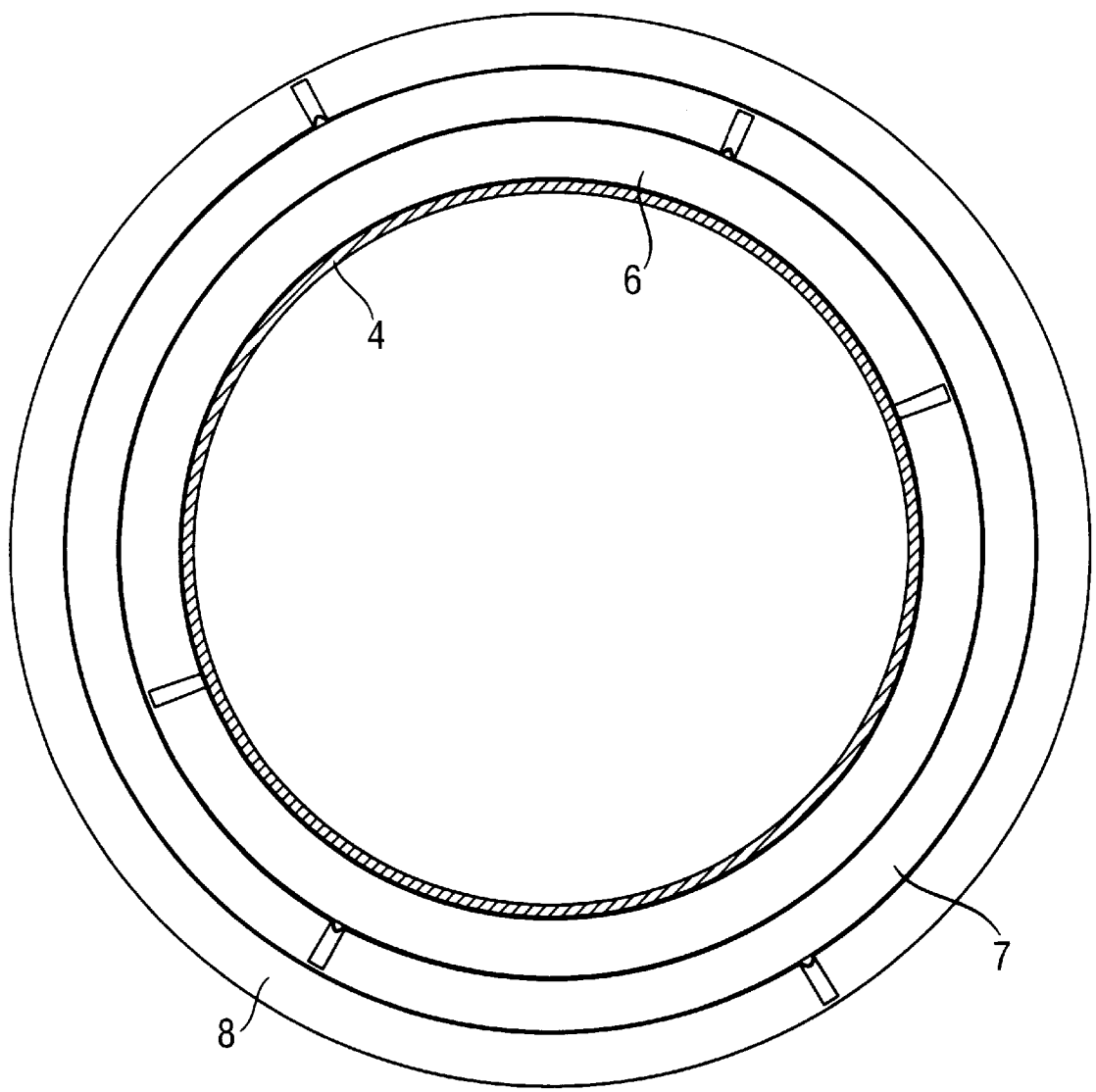
FIG. 4 shows a further preferred embodiment of a molded element in cross section.

Represented in FIG. 4 is a molded element which is constructed from a plurality of sheathed and evacuated layers (an inner layer 6, a middle layer 7 and an outer layer 8), which contain pressed and optionally hardened, microporous insulating material. For the insulation of a curved surface, the molded element is made to fit with its surface with the lamellar structure snugly against the curved surface and is fixed and the vacuum is subsequently destroyed in at least one layer, it being preferred for the vacuum to be preserved in at least one other layer. It is particularly preferred for the vacuum in the layer bearing against the curved surface to be destroyed and the vacuum in at least one other layer to be permanently preserved.

The molded element may be adhesively attached in its entirety or layer by layer, onto a pipe 4, for example, or fixed thereupon in some other way, for example by wrapping a tape, preferably a woven-fabric tape or adhesive tape, a plastic film or a metal foil around the molded element, or in each case a layer of the molded element, bearing against the pipe. A metal plate in the form of complete or half shells or suitable cut-to-size pieces may also be placed around the pipe and fixed. The vacuum maintained in the molded element is preferably destroyed in at least one of the layers in order to reduce or completely eliminate permeable locations in the thermal insulation possibly remaining. When the vacuum is destroyed, the volume of the molded element increases as a result of air flowing in, and the expanding molded element can close joints and gaps. The vacuum can be destroyed by deliberately damaging the sheathing of the layer, and if appropriate the item fixing the molded element, using an implement, or else by the sheathing being mechanically or thermally stressed by the effect of its ambient surroundings before or during its use until it tears, or thermally decomposes. The latter may happen, for example, in the thermal insulation of pipelines on account of the temperatures of the hot medium of up to 180° C., it being possible by suitable choice of the material of the sheathing in the case of a multilayer structure of the molded element to achieve decomposition only of the inner layer while preserving the vacuum in layers lying further to the outside.

The molded element, except for the lamellae, is preferably produced by a method which is already described in DE-4432896 A1. It also preferably has the composition specified there of 30 to 100% by weight of a fine-particled metal oxide, 0 to 50% by weight of an opacifier, 0 to 50% by weight of a fibrous material and 0 to 15% by weight of an inorganic binder. It is also preferred to select the metal oxide, fibrous material, opacifier and binder from the substances specified in DE-4432896 A1, organic fibers, for example viscose fibers, also coming into consideration as the fibers. Fillers, such as mica, pearlite or vermiculite, may also be contained, if appropriate.

After the production of the molded element, the lamellae are cut in by milling or sawing tools, for example pad or wire saws, and the molded element is introduced into a sheathing, evacuated and the sheathing is sealed. Provision of pores and channels in the molded element to speed up evacuation, as described in DE-4432896 A1, is expedient but not absolutely necessary. By the term "panel-shaped" is meant a shape which has a dimension in at least one direction which is substantially greater than its thickness.

EXAMPLE 1

A panel with dimensions of 965 mm by 500 mm by 20 mm was provided with 50 parallel incisions spaced 19.6 mm apart. The incisions had a base width of 2.5 mm. The panel thus obtained was welded within a multilayer composite film under a pressure of less than 200 mbar with an airtight effect, the originally planar panel already curving a little and thereby acting as a handling aid during fitting. Shorter fitting times may be the consequence of this alteration from the purely planar configuration. The panel was subsequently fitted with the incision-bearing surface adjacent a pipe, and fixed at points with adhesive tape. Subsequently, the sheathing was slit with a sharp implement and the panel, now fitting fit snugly on the pipe, was firmly wrapped around with the adhesive tape.

EXAMPLE 2

A pipe carrying hot medium of up to several hundred degrees is sheathed with three layers of evacuated panels, each of which is welded within a gastight multilayer film and has a lamellar structure incorporated on its surface. Each panel has a thickness of 12 mm, and the joints are staggered at the ends of the panels and around the circumference. Each individual layer is fixed with adhesive tape. During use, the first layer is thermally decomposed on account of the temperature resistance of the sheathing film so that the vacuum is destroyed, and the sealing effect is increased thereby. On account of the thermally insulating effect of the first layer, the sheathing of the next layers is preserved intact, which produces an optimum insulating effect on account of the particularly good thermally insulating effect of the evacuated systems.

What is claimed is:

1. A method of insulating curved surfaces with thermally insulating material, said method comprising positioning one or more layers of an evacuated molded element comprising a panel-shaped, evacuated, sheathing-surrounded, and thermally-insulating molded element comprising pressed and optionally hardened, microporous insulating material, wherein the molded element has a surface with a lamellar structure, the lamellae comprising elongate incisions into the surface having a depth of 40 to 95% of the thickness of the molded element, adjacent the curved surface, with the side of the insulating material having the lamellar structure against the curved surface, and destroying the vacuum in at least one layer of the one or more evacuated molded elements.

2. The method as claimed in claim 1, wherein the molded element is fixed to the curved surface by wrapping around at least one of said one or more layers, a woven-fabric tape, adhesive tape, plastic film, metal foil, or a cut-to-size metal plate.

3. The method as claimed in claim 1, wherein the vacuum is destroyed by damaging the sheathing of the layer using an implement which pierces the sheathing.

4. The method as claimed in claim 1, wherein the vacuum is destroyed by the sheathing of the layer being at least partially thermally damaged.

5. The method as claimed in claim 1, wherein the vacuum of at least one layer in the case of multilayer structures is destroyed by the sheathing being mechanically stressed until it tears.

6. The method as claimed in claim 1, wherein the vacuum in the layer bearing against the curved surface is destroyed and the vacuum in at least one other layer is permanently preserved.

7. The method as claimed in claim 1, wherein the molded element contains lamellae which have a base width b of from about 0.5 mm to about 5 mm, and the lamellae are positioned next to one another in parallel, spaced about 4 mm to about 40 mm apart.

8. The method of claim 7 wherein the lamellae have a cross-sectional shape which is square, rectangular, acute-angled or rounded.

9. The method of claim 1, wherein said curved surface is a pipe.

10. The method of claim 9, wherein said pipe comprises a pipeline for crude oil or a district heating line.

11. The method of claim 1, wherein said curved surface is a curved surface of an internal combustion engine, a turbine, or a chimney.

* * * * *